US008973080B2

(12) United States Patent
Oh et al.

(10) Patent No.: US 8,973,080 B2
(45) **Date of Patent: *Mar. 3, 2015**

(54) METHOD AND APPARATUS FOR GENERATING PLURALITY OF APPLICATIONS, AND METHOD AND APPARATUS FOR PROCESSING APPLICATION SUITABLE FOR BROADCASTING RECEIVING APPARATUS

(75) Inventors: Keum-yong Oh, Yongin-si (KR); Kwang-hyuk Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 676 days.

This patent is subject to a terminal disclaimer.

(21) Appl. No.: 11/857,769

(22) Filed: Sep. 19, 2007

(65) Prior Publication Data

US 2008/0072266 A1 Mar. 20, 2008

(30) Foreign Application Priority Data

Sep. 19, 2006 (KR) ........................ 10-2006-0090469

(51) Int. Cl.

*H04N 7/173* (2011.01)
*H04N 7/16* (2011.01)
*H04H 20/30* (2008.01)

(Continued)

(52) U.S. Cl.

CPC ............... *H04H 20/30* (2013.01); *H04H 60/73* (2013.01); *A63F 2300/409* (2013.01); *H04H 60/27* (2013.01)

USPC .............. 725/132; 725/59; 725/140; 725/152

(58) Field of Classification Search

USPC .............. 725/86–104, 131, 140, 152, 59, 132
See application file for complete search history.

(56) References Cited

U.S. PATENT DOCUMENTS

| | | | |
|---|---|---|---|
| 6,263,497 | B1 | 7/2001 | Maeda et al. |
| 7,150,029 | B1 | 12/2006 | Ebling et al. |

(Continued)

FOREIGN PATENT DOCUMENTS

| | | | |
|---|---|---|---|
| KR | 10-2001-0086157 | A | 9/2001 |
| KR | 10-2004-0066625 | A | 7/2004 |

(Continued)

OTHER PUBLICATIONS

Communication dated Aug. 8, 2012 issued by the Mexican Patent Office in counterpart Mexican Patent Application No. MX/a/2012/000859.

(Continued)

*Primary Examiner* — Nnenna Ekpo
(74) *Attorney, Agent, or Firm* — Sughrue Mion, PLLC

(57) ABSTRACT

A method and apparatus for processing and selecting an application easily processed by a broadcasting receiving apparatus among the plurality of applications and executing the selected application are provided. The application processing method includes: analyzing information on each of a plurality of applications providing a common broadcasting service; selecting an application suitable for a broadcasting receiving apparatus among the plurality of applications based on the analysis; and executing the selected application. When a plurality of applications is transmitted to a broadcasting receiving apparatus, the broadcasting receiving apparatus can select an easily executable application.

13 Claims, 5 Drawing Sheets

(51) Int. Cl.
*H04H 60/73* (2008.01)
*H04H 60/27* (2008.01)

(56) References Cited

U.S. PATENT DOCUMENTS

| | | | | |
|---|---|---|---|---|
| 7,546,383 | B2 * | 6/2009 | Smith | 709/246 |
| 7,716,702 | B2 * | 5/2010 | Helms | 725/41 |
| 2002/0120931 | A1 | 8/2002 | Huber et al. | |
| 2002/0138852 | A1 * | 9/2002 | Reynolds et al. | 725/136 |
| 2002/0188943 | A1 * | 12/2002 | Freeman et al. | 725/38 |
| 2003/0105845 | A1 | 6/2003 | Leermakers | |
| 2003/0208778 | A1 * | 11/2003 | Aratani et al. | 725/139 |
| 2003/0217369 | A1 * | 11/2003 | Heredia | 725/152 |
| 2004/0131020 | A1 | 7/2004 | Smith | |
| 2004/0131076 | A1 | 7/2004 | Smith | |
| 2004/0261136 | A1 | 12/2004 | Aratani et al. | |
| 2004/0268398 | A1 * | 12/2004 | Fano et al. | 725/88 |
| 2005/0044201 | A1 | 2/2005 | Suzuki et al. | |
| 2005/0073579 | A1 * | 4/2005 | Lepine et al. | 348/100 |
| 2006/0041509 | A1 | 2/2006 | Koerber | |
| 2006/0095952 | A1 | 5/2006 | Chung | |
| 2006/0190981 | A1 | 8/2006 | Weill et al. | |
| 2007/0204314 | A1 | 8/2007 | Hasek et al. | |
| 2009/0070754 | A1 | 3/2009 | Ichikawa | |

FOREIGN PATENT DOCUMENTS

| | | | |
|---|---|---|---|
| KR | 10-2004-0075459 | A | 8/2004 |
| KR | 10-2005-0106269 | A | 11/2005 |
| KR | 10-2005-0116627 | A | 12/2005 |

OTHER PUBLICATIONS

Communication dated Apr. 24, 2012, issued by the Korean Intellectual Property Office in counterpart Korean Application No. 10-2007-0092140.

Communication dated Mar. 27, 2012, issued by the Canadian Intellectual Property Office in counterpart Canadian Application No. 2,655,339.

* cited by examiner

METHOD AND APPARATUS FOR GENERATING PLURALITY OF APPLICATIONS, AND METHOD AND APPARATUS FOR PROCESSING APPLICATION SUITABLE FOR BROADCASTING RECEIVING APPARATUS

CROSS-REFERENCE TO RELATED PATENT APPLICATIONS

This application claims priority from Korean Patent Application No. 10-2006-0090469, filed on Sep. 19, 2006, in the Korean Intellectual Property Office, the disclosure of which is incorporated herein in its entirety by reference.

BACKGROUND OF THE INVENTION

1. Field of the Invention

Apparatuses and methods consistent with the present invention relate to data broadcasting, and more particularly, to generating a plurality of applications, selecting an application easily processed by a broadcasting receiving apparatus among the plurality of applications and executing the selected application.

2. Description of the Related Art

Data broadcasting provides general information relating to broadcasting programs, living information, Internet access, electronic commerce, bi-directional entertainment in addition to existing broadcasting programs using broadcasting networks such as ground waves, satellite, or cable, etc. The international data broadcasting specifications include open cable application platform (OCAP), advanced common application platform (ACAP), multimedia home platform (MHP), etc.

FIG. 1 is a diagram of one application transferred to one broadcasting receiving apparatus. Referring to FIG. 1, a data broadcasting apparatus 110 generates an application and transmits the application to a data broadcasting receiving apparatus 120. The application is an application program executed based on a Java virtual machine (JVM) of a broadcasting receiver. The application transmitted from the data broadcasting apparatus 110 is loaded by an application processor 123 of the data broadcasting receiving apparatus 120 and processed. Broadcasting including media data such as audio and video data and the application as well provides a user with various pieces of information relating to the media data.

However, applications having one object mostly aim at one type of broadcasting receiving apparatus. Generally, applications having one object aim at a broadcasting receiving apparatus having a large display. Therefore, there is no application suitable for a broadcasting receiving apparatus in different form, e.g. a small mobile device.

SUMMARY OF THE INVENTION

The present invention provides an application generating method and apparatus for transmitting a plurality of applications aiming at broadcasting receiving apparatuses having various forms.

The present invention also provides an application processing method and apparatus for selecting an application suitable for a broadcasting receiving apparatus when a plurality of applications are transmitted to the broadcasting receiving apparatus and executing the selected application.

According to an aspect of the present invention, there is provided an application generating method comprising: generating a plurality of applications selectively executed by a broadcasting receiving apparatus and information on each of the plurality of applications; and transmitting the plurality of applications and the information on each of the plurality of applications, wherein the plurality of applications provide a common broadcasting service.

The information on each of the plurality of applications may include information on the broadcasting receiving apparatus that executes the plurality of applications.

The information on the broadcasting receiving apparatus may include at least one of identification information and version information on the broadcasting receiving apparatus.

The information on each of the plurality of applications may be defined based on a function performed by the broadcasting receiving apparatus.

According to another aspect of the present invention, there is provided an application generating apparatus comprising: an application generator which generates a plurality of applications selectively executed by a broadcasting receiving apparatus and information on each of the plurality of applications; and an application transmitter which transmits the plurality of applications and the information on each of the plurality of applications, wherein the plurality of applications provide a common broadcasting service.

According to another aspect of the present invention, there is provided an application processing method comprising: analyzing information on each of a plurality of applications providing a common broadcasting service; selecting an application suitable for a broadcasting receiving apparatus among the plurality of applications based on the analysis; and executing the selected application.

The selecting of the application may comprise: comparing information on the broadcasting receiving apparatus that executes the selected application included in the information on each of the plurality of applications with information on the broadcasting receiving apparatus that receives the selected application.

The selecting of the application may further comprise: comparing information on a function performed by the broadcasting receiving apparatus included in the information on each of the plurality of applications with information on a function performed by the broadcasting receiving apparatus that receives the selected application.

The executing of the selected application may comprise: acquiring the selected application using component tags which are information on carousel included in the information on each of the plurality of applications and association tags which are information on carousel included in a program map table of a stream including the selected application.

According to another aspect of the present invention, there is provided an application processing apparatus comprising: an application information analyzer which analyzes information on each of a plurality of applications providing a common broadcasting service; an application selector which selects an application suitable for a broadcasting receiving apparatus among the plurality of applications based on the analysis; and an application executor which executes the selected application.

According to another aspect of the present invention, there is provided a computer readable medium having embodied thereon a computer program for executing an application generating method, the method comprising: generating a plurality of applications that provide a common broadcasting service selectively executed by a broadcasting receiving apparatus and information on each of the plurality of applications; and transmitting the plurality of applications and the information on each of the plurality of applications, wherein the plurality of applications provide a common broadcasting service.

According to another aspect of the present invention, there is provided a computer readable medium having embodied thereon a computer program for executing an application processing method, the method comprising: analyzing information on each of a plurality of applications providing a common broadcasting service; selecting an application suitable for a broadcasting receiving apparatus among the plurality of applications based on the analysis; and executing the selected application.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENTS

The present invention will now be described more fully with reference to the accompanying drawings.

Figure 1:
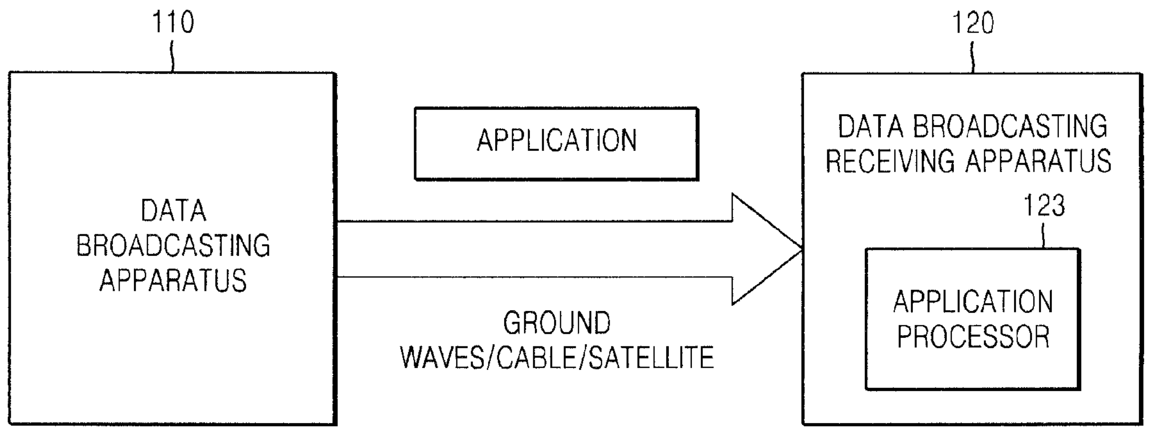
FIG. 1 (RELATED ART)
FIG. 1 is a diagram of one application transferred to one broadcasting receiving apparatus.
Figure 2:
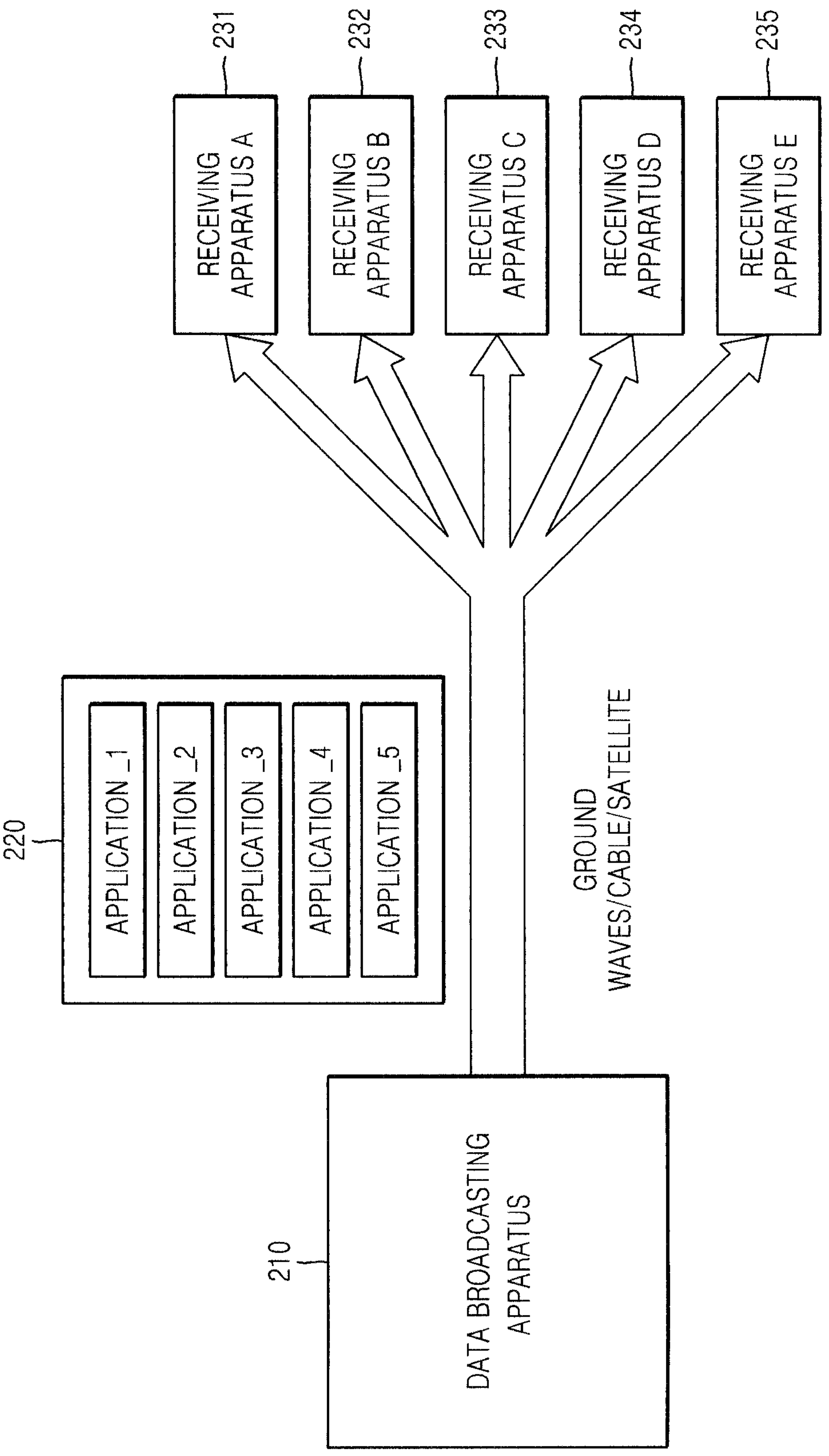
FIG. 2 is a diagram of a system in which a plurality of applications are transferred to various kinds of broadcasting receiving apparatuses according to an exemplary embodiment of the present invention.

FIG. 2 is a diagram of a system in which a plurality of applications 220 are transferred to various kinds of broadcasting receiving apparatuses according to an exemplary embodiment of the present invention. Referring to FIG. 2, a data broadcasting apparatus 210 generates the plurality of applications having a different function according to kinds of broadcasting receiving apparatuses. Although the plurality of applications 220 have a common object, they are selectively executed by broadcasting receiving apparatuses having different additional functions. In detail, the plurality of applications 220 have different properties, and must be selectively executed by broadcasting receiving apparatuses. The number of applications transferred to one broadcasting receiving apparatus is not limited, and can be determined according to the type or specification of the broadcasting receiving apparatus.

The plurality of applications 220 includes application_1, application_2, application_3, application_4, and application_5. It is assumed that the plurality of applications 220 have a common object to provide a sports game.

The application_1 provides a sports game and additional information such as information on football players, game progress, etc. The application_2 provides the sports game filmed at a different angle through another channel when the sports game is provided. Here, the other channel may be a channel having a physically same frequency, or another logical channel included in a physical channel such as a multi mode service (MMS).

The application_3 provides a function of recording the sports game broadcasting while providing the sports game. The application_4 provides the sports game and a video clip, for example, an interview with football players. The video clip may be information received through a broadcasting channel or information recorded in a receiving terminal. Although the application_5 is identical to the application_1, it provides a graphic user interface (GUI) for a small screen.

Receiving terminal A 231 through receiving terminal E 235 are televisions having a function of displaying a received broadcasting signal but have different specifications. The receiving terminal A 231 is a large television providing a broadcasting signal received through a tuner on a large screen. The receiving terminal B 232 is a television having two tuners and providing a picture in picture (PIP) function of providing two broadcasting signals received through two channels. The receiving terminal C233 is a television having a recording function. The receiving terminal D 234 is a television having a function of decoding two pieces of video data. The receiving terminal E 235 is a small television providing a received broadcasting signal on a small screen.

Although the application_1 through the application_5 are simultaneously transferred through a predetermined broadcasting channel, each receiving terminal executes a different application. It is suitable to execute the application_1 in the receiving terminal A 231. It is suitable to execute the application_2 in the receiving terminal B 232. It is suitable to execute the application_3 in the receiving terminal C 233. It is suitable to execute the application_4 in the receiving terminal D 234. It is suitable to execute the application_5 in the receiving terminal E 235.

Therefore, in an environment where the plurality of applications 220 are transferred, each receiving terminal selects an application easily executed among the plurality of applications 220 to execute the selected application.

Figure 3:
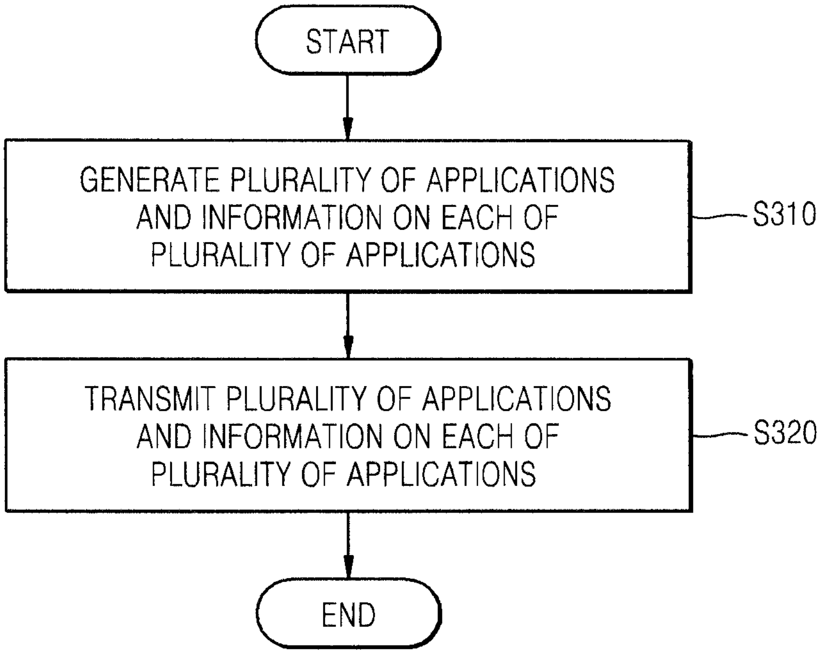
FIG. 3 is a flowchart illustrating a method of generating a plurality of applications according to an exemplary embodiment of the present invention.

FIG. 3 is a flowchart illustrating a method of generating a plurality of applications according to an exemplary embodiment of the present invention. Referring to FIG. 3, the plurality of applications and information on each of the plurality of applications are generated in operation 310. As mentioned above, the plurality of applications provide a common broadcasting service and an additional function selectively executed by a broadcasting receiving apparatus. The information on each of the plurality of applications may be transferred to an application information table (AIT) or an eXtended application information table (XAIT). The AIT includes overall information on a broadcasting service, information on an application transferred through broadcasting, etc.

The information on each of the plurality of applications according to an exemplary embodiment of the present invention includes information on a broadcasting receiving apparatus that is able to execute the plurality of applications. For example, the information on the broadcasting receiving apparatus includes at least one of identification information or version information on the broadcasting receiving apparatus. The AIT can include information on an application with respect to a broadcasting receiving terminal A, information on an application with respect to a broadcasting receiving terminal B, . . . , information on an application with respect to a broadcasting receiving terminal N.

The information on each of the plurality of applications can be defined based on a function performed by the broadcasting receiving apparatus. For example, the AIT can include information on an application with respect to a function A, information on an application with respect to a function B, . . . , information on an application with respect to a function N.

An AIT corresponding to each of the plurality of applications is transmitted to provide the information on each of the plurality of applications according to a broadcasting receiving apparatus or a function. The information on each of the plurality of applications can have a variety of forms.

The plurality of applications and the information on each of the plurality of applications are transmitted in operation 320 via a ground wave, an Internet network, or a satellite.

Figure 4:
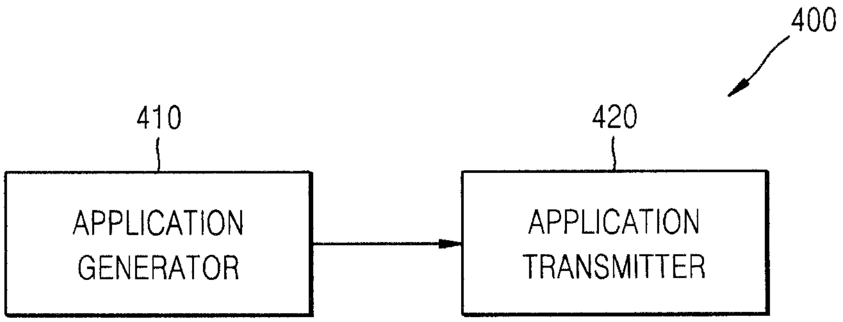
FIG. 4 is a block diagram of an apparatus for generating a plurality of applications according to an exemplary embodiment of the present invention.

FIG. 4 is a block diagram of an apparatus 400 for generating a plurality of applications according to an exemplary embodiment of the present invention. Referring to FIG. 4, the apparatus 300 for generating a plurality of applications comprises an application generator 410 and an application transmitter 420.

The application generator 410 generates the plurality of applications which provide a common broadcasting service and is selectively executed by a broadcasting receiving apparatus, and information on each of the plurality of applications. The information on each of the plurality of applications includes information on the broadcasting receiving apparatus that executes the plurality of applications. For example, the information on the broadcasting receiving apparatus includes at least one of identification information and version information on the broadcasting receiving apparatus. The information on each of the plurality of applications can be defined based on a function performed by the broadcasting receiving apparatus.

The application transmitter 420 transmits the plurality of applications and the information on each of the plurality of applications. The application transmitter 420 generates a transmission stream for transmitting the plurality of applications and the information on each of the plurality of applications, and transmits the transmission stream using a carousel method suitable for broadcasting.

For example, the application transmitter 420 generates the plurality of applications and the information on each of the plurality of applications in the form of an MPEG-2 transmission stream, sequentially converts the MPEG-2 transmission stream into an object carousel, a data carousel, and a MPEG-2 digital storage media command and control (DSM-CC) message, and broadcasts the DSM-CC message.

The DSM-CC is the standard technology defined by International Organization for Standardization/International Electrotechnical Commission (ISO/IEC) 13818-6 and indicates a transport layer message for a data service. The ISO/IEC 13818-6 is the MPEG standard technology relating to a carousel structure and a transmission method. The data carousel is mechanism for a periodic transmission of a data module defined by a DSM-CC user-to-network (U-N) download protocol. The object carousel is mechanism for a periodic transmission of a DSM-CC user-to-user (U-U) object above the data carousel, and carries a layer file structure using a DSM-CC U-U file/directory object.

Figure 5:
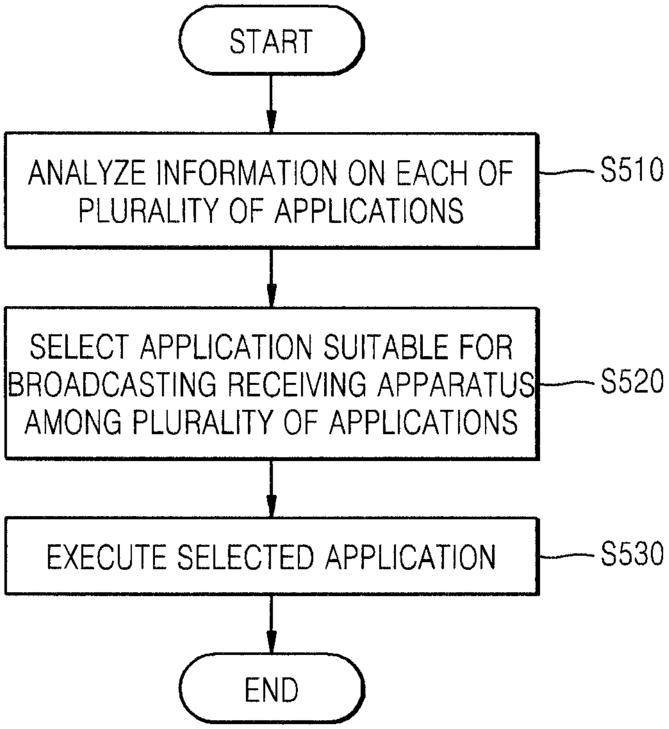
FIG. 5 is a flowchart illustrating a method of processing an application suitable for a broadcasting receiving apparatus among a plurality of applications according to an exemplary embodiment of the present invention.

FIG. 5 is a flowchart illustrating a method of processing an application suitable for a broadcasting receiving apparatus among a plurality of applications according to an exemplary embodiment of the present invention. Referring to FIG. 5, information on each of the plurality of applications providing a common broadcasting service is analyzed in operation 510.

The application suitable for the broadcasting receiving apparatus is selected among the plurality of applications based on the analysis in operation 520.

In operation 520, information on the broadcasting receiving apparatus that executes the plurality of applications included in the information on each of the plurality of applications is compared with information on the broadcasting receiving apparatus that receives the plurality of applications to select a matching application. Or, in operation 520, information on a function performed by the broadcasting receiving apparatus included in the information on each of the plurality of applications is compared with information on a function performed by the broadcasting receiving apparatus that receives the plurality of applications to select the matching application.

The selected application is executed in operation 530.

Figure 7:
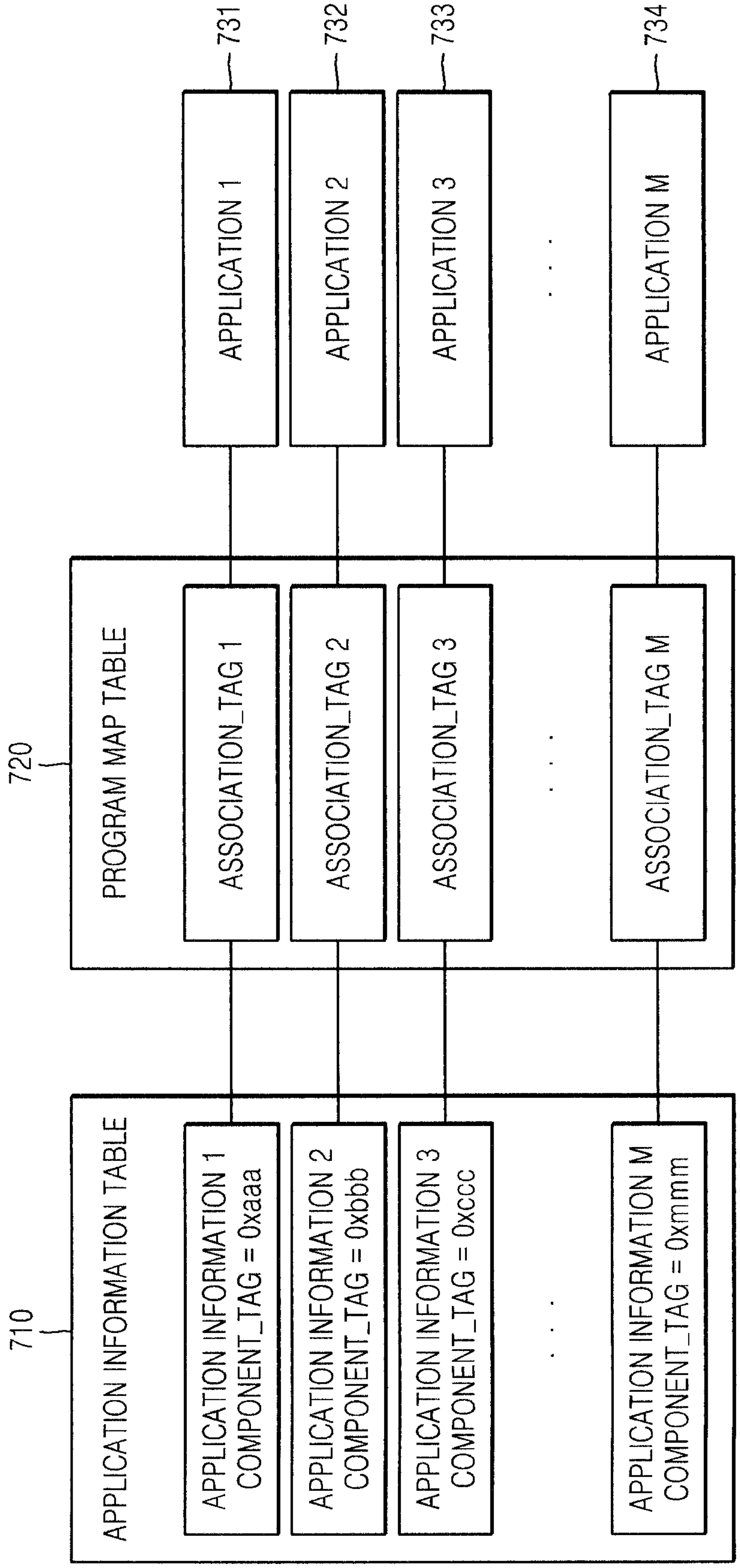
FIG. 7 is a diagram for explaining an application executing method according to an exemplary embodiment of the present invention.

FIG. 7 is a diagram for explaining an application executing method according to an exemplary embodiment of the present invention. Referring to FIG. 7, information on each of a plurality of applications 711-714 included in an application information table 710 is transmitted. The information on each of the plurality of applications 711-714 include a component tags for identifying basic service components transferring the plurality of applications. The identified service components are a stream for transferring information on an object carousel.

Association tags 721-724 describing carousel information are included in a program map table 720 in the stream. Each of the plurality of applications 731-734 can be retrieved from streams linked with the association tags 721-724.

Therefore, in operation 530 illustrated in FIG. 5, the selected application is acquired and executed using the component tags which are information on the carousel included in the information on each of the plurality of applications and the association tags 721-724 which are information on the carousel included in the program map table 720 of the stream including the selected application.

Figure 6:
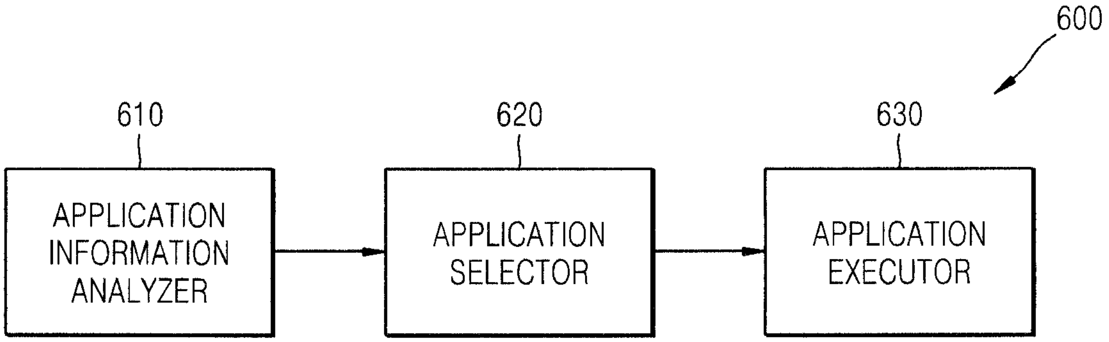
FIG. 6 is a block diagram of an apparatus for processing an application suitable for a broadcasting receiving apparatus among a plurality of applications according to an exemplary embodiment of the present invention.

FIG. 6 is a block diagram of an apparatus 600 for processing an application suitable for a broadcasting receiving apparatus among a plurality of applications according to an exemplary embodiment of the present invention. Referring to FIG. 6, the apparatus 600 for processing the application comprises an application information analyzer 610, an application selector 620, and an application executor 630.

The application information analyzer 610 analyzes information on each of the plurality of applications providing a common broadcasting service.

The application selector 620 selects an application suitable for the broadcasting receiving apparatus among the plurality of applications based on the analysis. The application selector 620 compares information on the broadcasting receiving apparatus that executes the plurality of applications included in the information on each of the plurality of applications with information on the broadcasting receiving apparatus that receives the plurality of applications to select a matching application. The broadcasting receiving apparatus stores identification information identified by another apparatus and version information, and communicates with the apparatus 600 for processing the application to provide the identification information and the version information.

Or, the application selector 620 compares information on a function performed by the broadcasting receiving apparatus included in the information on each of the plurality of applications with information on a function performed by the broadcasting receiving apparatus that receives the plurality of applications to select the matching application.

The application executor 630 executes an application included in a transmission stream described by the information on each of the plurality of applications. The application executor 630 acquires the selected application and executes the acquired application using component tags which are information on a carousel included in the information on each of the plurality of applications and association tags which are information on the carousel included in a program map table of a stream including the selected application.

The apparatus 600 for processing the application can be included in a data broadcasting receiving apparatus. Although the data broadcasting receiving apparatus including the apparatus 600 for processing the application receives the plurality of applications providing a common broadcasting service, it can select an application easily executed and execute the selected application. Or, the apparatus 600 for processing the application communicates with the data broadcasting receiving apparatus through a predetermined interface so that an application easily executed by the data broadcasting receiving apparatus can be selected.

The present invention can also be embodied as computer readable code on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks and optical data storage devices. The computer readable recording medium can also be distributed network coupled computer systems so that the computer readable code is stored and executed in a distributed fashion.

The present invention provides an application generating method and apparatus that transmit a plurality of applications selected by a broadcasting receiving apparatus. Therefore, an application manufacturer may not have to correct an existing application but manufacture an application necessary for various kinds of broadcasting receiving apparatuses or a newly developed broadcasting receiving apparatus using the application generating method and an apparatus according to the exemplary embodiments of the present invention.

Further, the present invention provides an application processing apparatus and method that selects an application easily executed by a broadcasting receiving apparatus when a plurality of applications are transferred to the broadcasting receiving apparatus. Therefore, the broadcasting receiving apparatus using the application processing apparatus and method according to the exemplary embodiments of the present invention may select an application suitable for the broadcasting receiving apparatus although the broadcasting receiving apparatus receives the plurality of applications, which does not need to store all applications, thereby avoiding unnecessary memory consumption and providing an efficient broadcasting service.

While the present invention has been particularly shown and described with reference to the exemplary embodiments thereof, it will be understood by those of ordinary skill in the art that various changes in form and details may be made therein without departing from the spirit and scope of the present invention as defined by the following claims.

What is claimed is:

1. An application processing method comprising:

receiving a plurality of applications and information on the plurality of applications, wherein the plurality of applications provide a plurality of different functions, and are configured to be executable by a plurality of receiving apparatuses, respectively;

extracting information on an attribute regarding an identification of each of the plurality of receiving apparatuses, which is able to execute a corresponding application among the plurality of applications, from the information on the plurality of applications;

selecting an application, among the plurality of applications, which is executable by a receiving apparatus which receives the plurality of applications and the information on the plurality of applications, by comparing the extracted information on the attribute regarding the identification of each of the plurality of receiving apparatuses with information on an attribute regarding an identification of the receiving apparatus; and executing the selected application.

2. The method of claim 1, wherein the information on the attribute regarding the identification of the receiving apparatus which receives the plurality of applications and the information on the plurality of applications comprises at least one of identification information and version information on receiving apparatus which receives the plurality of applications and the information on the plurality of applications.

3. An application processing apparatus comprising:

a receiver which receives a plurality of applications and information on the plurality of applications, wherein the plurality of applications provide a plurality of different functions, and are configured to be executable by a plurality of receiving apparatuses, respectively;

an application information extractor which extracts information on an attribute regarding an identification of each of the plurality of receiving apparatuses, which is able to execute a corresponding application among the plurality of applications, from the information on the plurality of applications;

an application selector which selects an application, among the plurality of applications, which is executable by a receiving apparatus which receives the plurality of applications and the information on the plurality of applications, by comparing the extracted information on the attribute regarding the identification of each of the plurality of receiving apparatuses with information on an attribute regarding an identification of the receiving apparatus; and an application executor which executes the selected application.

4. The apparatus of claim 3, wherein the information on the attribute regarding the identification of the receiving apparatus which receives the plurality of applications and the information on the plurality of applications comprises at least one of identification information and version information on the broadcasting receiving apparatus which receives the transmission stream.

5. A non-transitory computer readable medium having embodied thereon a computer program for executing an application processing method, the method comprising:

receiving a plurality of applications and information on the plurality of applications, wherein the plurality of applications provide a plurality of different functions, and are configured to be executable by a plurality of receiving apparatuses, respectively;

extracting information on an attribute regarding an identification of each of the plurality of receiving apparatuses, which is able to execute a corresponding application among the plurality of applications, from the information on the plurality of applications;

selecting an application, among the plurality of applications, which is executable by a receiving apparatus which receives the plurality of applications and the information on the plurality of applications, by comparing the extracted information on the attribute regarding the identification of each of the plurality of receiving apparatuses with information on an attribute regarding an identification of the receiving apparatus; and executing the selected application.

6. The method of claim 2, wherein the version information on the receiving apparatus is used to identify a function necessary to allow the receiving apparatus to execute the selected application.

7. The apparatus of claim 4, wherein the version information on the receiving apparatus is used to identify a function necessary to allow the receiving apparatus to execute each of the selected application.

8. The method of claim 1, wherein the selecting is performed by an application processing apparatus which is connected to the broadcasting receiving apparatus, wherein the information on the attribute regarding the identification of the receiving apparatus which is compared with the information on the attribute regarding the identification of each of the plurality of receiving apparatuses is received at the application processing apparatus through the connection between the application processing apparatus and the receiving apparatus, and wherein the receiving apparatus is an apparatus at which a result of the executing the selected application is delivered to a user.

9. The apparatus of claim 3, wherein the application processing apparatus is connected to the receiving apparatus, wherein the information on the attribute regarding the identification of the receiving apparatus which is compared with the information on the attribute regarding the identification of each of the plurality of receiving apparatuses is received at the application selector from the receiving apparatus through the connection between the application processing apparatus and the receiving apparatus, and wherein the receiving apparatus is an apparatus at which a result of the executing the selected application is delivered to a user.

10. The non-transitory computer readable medium of claim 5, wherein the selecting is performed by an application processing apparatus which is connected to the receiving apparatus, wherein the information on the attribute regarding the identification of the receiving apparatus which is compared with the information on the attribute regarding the identification of each of the plurality of receiving apparatuses is received at the application processing apparatus through the connection between the application processing apparatus and the receiving apparatus, and wherein the receiving apparatus is an apparatus at which a result of the executing the selected application is delivered to a user.

11. The method of claim 1, wherein the plurality of applications are configured to be executable by the plurality of receiving apparatuses, respectively and exclusively to one another.

12. The apparatus of claim 3, wherein the plurality of applications are configured to be executable by the plurality receiving apparatuses, respectively and exclusively to one another.

13. The non-transitory computer readable medium of claim 5, wherein the plurality of applications are configured to be executable by the plurality of receiving apparatuses, respectively and exclusively to one another.

* * * * *